Sept. 8, 1970 P. L. FARREN 3,527,353

STORAGE DEVICE

Filed Aug. 13, 1968 3 Sheets-Sheet 1

Paul L. Farren
INVENTOR.

BY Robert W. B. Dickerson

ATTORNEY

Paul L. Farren
INVENTOR.

BY Robert W. B. Dickerson

ATTORNEY

Paul L. Farren
INVENTOR.
BY Robert B. Dulaney
ATTORNEY

United States Patent Office 3,527,353

Patented Sept. 8, 1970

3,527,353

STORAGE DEVICE

Paul L. Farren, 5603 S. Rice Ave.,
Houston, Tex. 77036

Continuation-in-part of applications Ser. No. 536,760, Mar. 23, 1966, and Ser. No. 664,323, Aug. 30, 1967. This application Aug. 13, 1968, Ser. No. 752,303
Int. Cl. A47b *43/00, 63/06, 57/28*
U.S. Cl. 211—40 3 Claims

ABSTRACT OF THE DISCLOSURE

Tray and tray support for tape reels, the tray support so positioning the tray that the reels riding therein may be biased toward one tray end. The support includes oppositely disposed groups of arms that extend, cantilever style, from opposite sides of vertical structural members. The trays are linked to such arms, and include portions dividing the tray into a plurality of side-by-side runways. The tray and support, independent of vertical structural members, may form a unitary and independently usable shelf.

BACKGROUND OF THE INVENTION

Field of the invention

This invention concerns a device for retrievably storing data, and is a continuation-in-part of (1) my copending application Ser. No. 664,323 filed Aug. 30, 1967, now Pat. No. 3,424,316 and of (2) my copending application Ser. No. 536,760 filed Mar. 23, 1966, now Pat. No. 3,396,840. More particularly, this application concerns a tiltable storage shelf on which containers, data, or compilations of data on reels may be stored in such a manner whereby the entire device may be expeditiously assembled in a manner providing extreme ease of access to the data. Inasmuch as modern industry gathers, requires and utilizes tremendous quantities of information, the pure volume of compiled data is daily increasing. This data has been stored in many forms, such as in volumes, tape reels, or microfilm, etc. These, in turn, may be placed in drawers, on shelves, or in libraries. Such an increasing volume of information, information which must be retrievable, requires an ever increasing amount of space for storage. Such practices have included heretofore the back to back placement common to libraries, flat shelved vertical storage and the like. Such arrangements therefore normally require aisle space between each upright storage structure, shelf or container.

Description of the prior art

Prior to the concepts described by this invention and its parent applications, containers for tape reels have either provided flat shelves for stacking the reels one atop the other, or compartmented flat containers for positioning the reels on their edges, one deep, in a side-by-side arrangement. In the unrelated area of food displays, some devices have provided for rows of cans, for example, to be biased toward the front of the shelf, for ease of removal. Prior to the invention in this and its related applications there was no device known to applicant for storing a plurality of reels one behind the other, biasing them toward the tray front, and for making it visually obvious when a compartment contained a single reel rather than a plurality.

SUMMARY OF THE INVENTION

This invention contemplates the storage of a plurality of containers, such as tape reels, on each of a plurality of shelves wherein, on removing the nearest container, the one next removed may automatically assume an available position. Such an action is permitted by having the shelf bottom tilted or inclined with respect to the horizontal. The shelves may consist of side arms adjustably linked by tray means, the side arms being connected, cantilever style, to upright notched, or otherwise apertured, support structures. The individual trays may be individually partitioned into a plurality of runways.

DETAILED DESCRIPTION OF THE INVENTION

Figure 1:
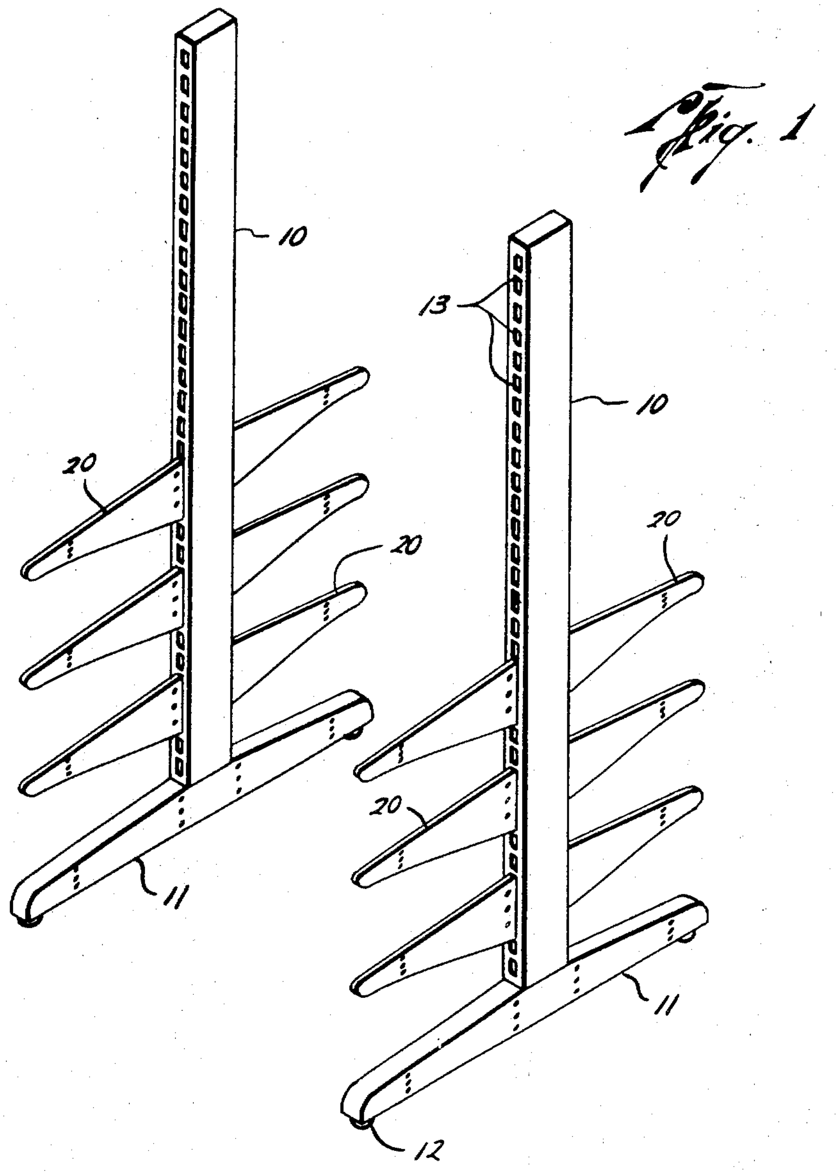
FIG. 1 is a perspective of the supporting structure, without the trays linking the side arms.
Figure 3:
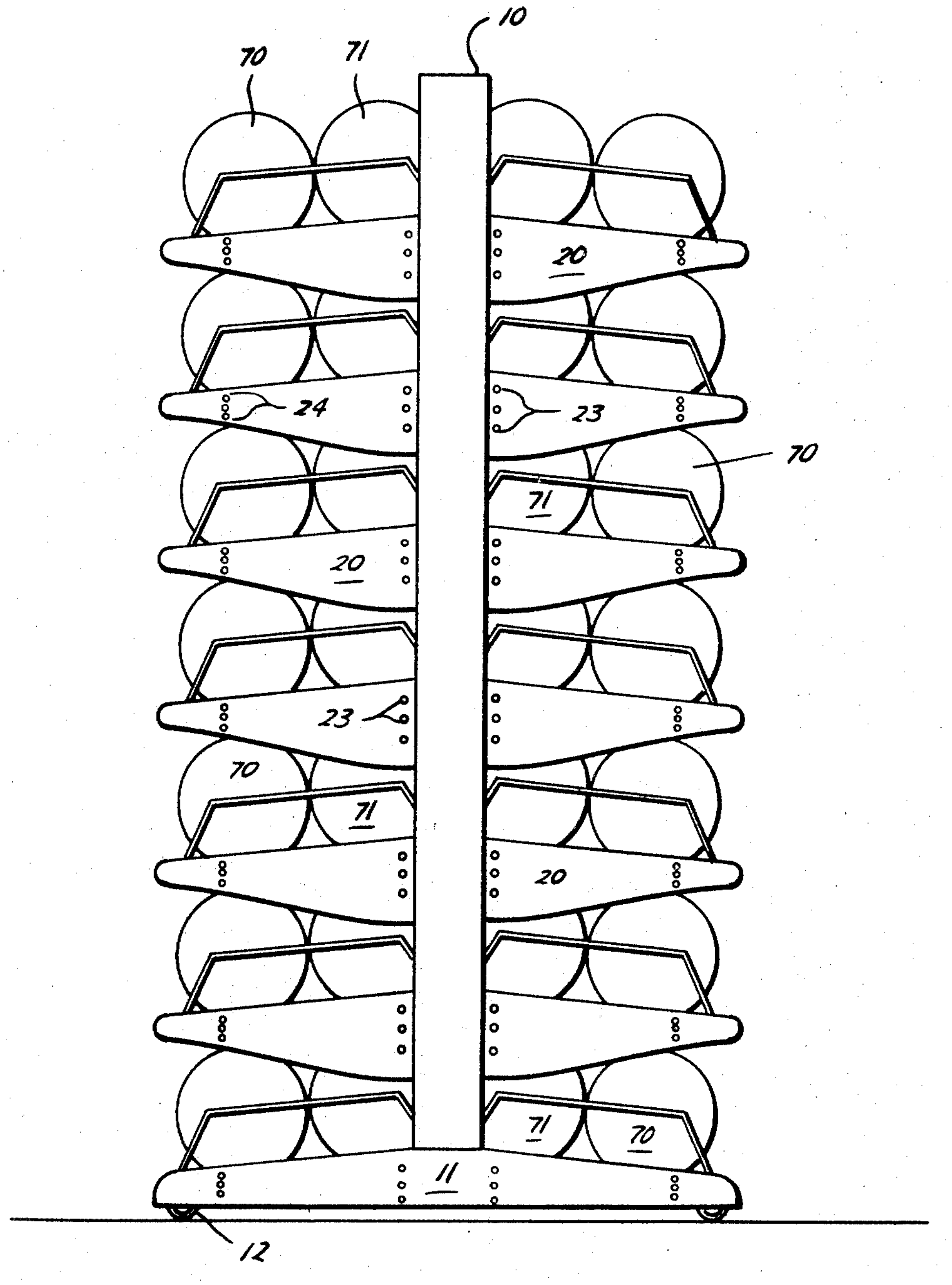
FIG. 3 is a somewhat schematic side view of the assembled device.

FIGS. 1 and 3 illustrate the nature of assembling the entire device. Upright posts 10 are spaced apart and each is linked to stand 11. The stand may include wheels or casters 12 for ease of motion if desired, or such members 12 may comprise a fixed scratch resistant material. It is seen that posts 10 include a number of vertically spaced slots or apertures 13 for a purpose hereinafter described. There may be such slots on opposite sides of the posts, and the vertical distance between slots may be varied.

A pair of side arms 20 are removably affixed to parallel slots in adjacent upright posts 10, by virtue of lugs 21 which would fit within adjacent slots 13 in a known manner. Such side arms may be formed from a flat plate, have lugs 21 at one end 22 of the arm, and have a plurality of fastener-accommodating adjustment holes 23, 24 near opposite ends of the arm. They may be rectangular, rather than tapered as shown.

Interconnecting the side arms, and thereby the vertical posts, are trays generally illustrated at 30. Each tray would have a bottom 31, side walls 32 (only one such side wall being shown in the section of FIG. 4), and front and rear walls forming lips 33. The trays 30, together with oppositely disposed side arms 20, may form shelves. Each side wall 32 of the tray has fastener-accommodating openings 34, 35 near opposite ends thereof. Fasteners (not shown) such as nuts and bolts, may then be passed through such openings 34 which would be aligned with like apertures 23, 24 in each of the side arms. Inasmuch as there are a plurality of vertically disposed apertures 23 and 24 in each of the side arms, it is obvious that adjustment is possible by selecting from one of the several bolt holes in the side arms. This permits the tray 30 to be secured at an angle, with respect to vertical posts 10, ranging from less than 90 degrees to one greater than 90 degrees, i.e., from acute to obtuse. Obviously, the angular relationship between tray bottom 31 and side arms 20 is also variably selectable. This means that tray bottom 31, on which tape reels 70, 71 (see FIG. 4) ride, may be tilted so as to bias such reels toward one of lips 33. Further, the tray and side arms may be removed from the posts and placed on any flat surface to form, by virtue of the adjustable connections between the tray and side arms, an inclined surface on which the reels can ride. Normally, shelves would be affixed to both sides of the upright posts, as shown in FIG. 3, and the shelves would be so inclined as to bias the reels away from the center posts. It is contemplated that these devices may have utility at locations where it would be advantageous to only have shelves at one side of the posts. For example, such configuration may appropriately be used for storage against a wall. In such a use the combination of post 10 and stand 11 instead of being T shaped, as shown, may be L configured, i.e., that portion of the stand to one side of post 10 in FIG. 3 would be deleted. Further in some situations it may be advantageous for the reels to be grasped between the upright posts. This might be true if there were a line of instruments forming a computer bank, a series of L shaped stands erected, as described above, and a minimum aisle space available between the computer bank and the extended stand. The angular adjustment of the shelves would permit the reels to roll toward the center posts as desired in this particular instance.

Figures 4, 5, 6:
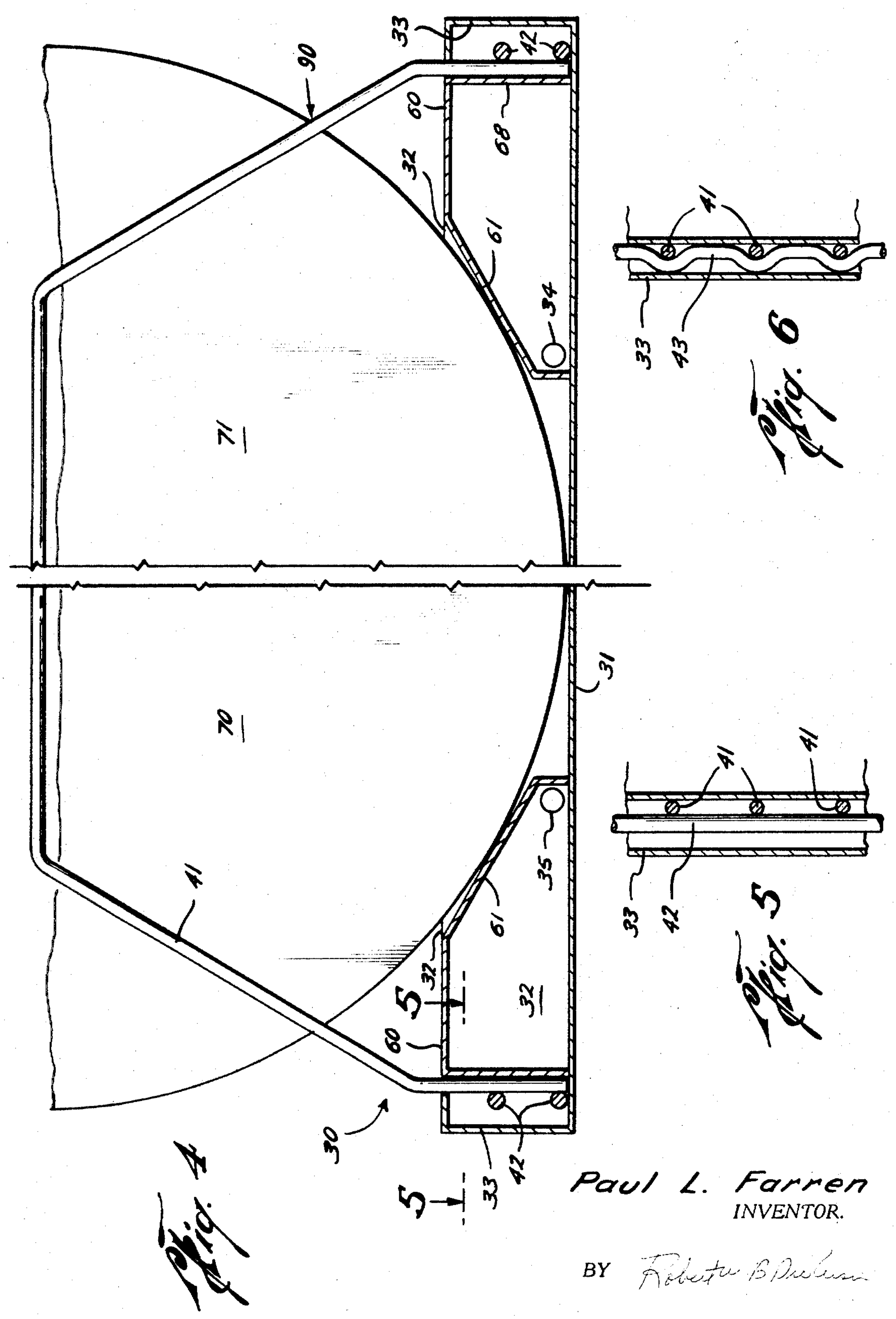
FIG. 4 is a broken vertical section through one of the individual trays.
FIG. 5 is a detail section taken along line 5—5 of FIG. 4.
FIG. 6 is a modification of the tray detail shown in FIG. 5.

Looking particularly at some of the tray details shown in FIGS. 4, 5 and 6, the tray is capable of holding a plurality of upright reels such as 70, 71, one behind the other, within each compartment or runway. A plurality of these compartments are formed by divider means such as plates or parallel bent rods 41. These rods may be separated by the proper distance approximately the width of the tape reels utilized therein, by welding or similarly affixing them to struts 42, as shown in FIG. 5, or alternatively by inserting rod ends within spaces formed by corrugations in a corrugated member 43, as shown in FIG. 6. Blocking members 60 are positioned near front and rear lips 33. These members tend to prevent the reels from rolling out of the tray, to cushion, by virtue of inclined ramp portion 61 the force that may be exerted against the tape reels when they roll against portions of the tray, and by virtue of the spacing between such members 60 being proportioned to the radial dimensions of the reels, one reel will come to rest at a different level of the ramp if there is no other reel there-adjacent from that which it would assume if there is such other reel. This same effect may be produced by other detent means such as by interconnecting members 41 with a strut (not shown) at 90 in FIG. 4, or by shortening bottom wall 31 of the tray so that the reels ride against lips 33. Further blocking means 60 may be rotated so that wall 68 is forwardly, to accommodate reels of smaller dimensions.

Figure 2:
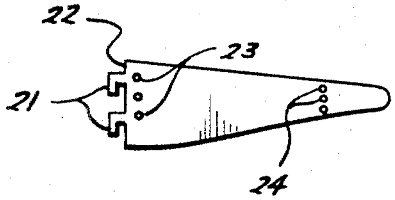
FIG. 2 is a side elevation of one of the individual arms.

It will be seen then that the trays shown generally in FIG. 4 may be linked to side arms 20 (FIG. 2) to form shelves. These shelves may then be affixed to posts 10 in a cantilever manner which requires lesser supporting structure than standard shelving, is more attractive and provides greater ease of access. The utilization of the trays themselves as the structural means of linking adjacent posts 10 represents an improvement over features of the above described Ser. No. 664,323. Additionally the manner of joining the tray to the side arms provides substantial adjustability. For example it has previously been mentioned how the trays may be tilted in either direction. Further the trays may be fixed in a level manner to store other items than tape reels. (It goes without saying that dividing means 41, 42 or 41, 43 (FIG. 6) may be removable. This may also be true of blocking means 60 which may be removably affixed to the floor or side walls of the tray, or may be formed or molded integral therewith.) Further, coiled springs could conceivably be substituted for such divider and blocking means. Lastly, the trays may be inverted to provide a flat upper surface for storing paper goods, disc packs, tab cards or the like thereon. Thus a completely functional, multi-purpose storage vehicle is provided, one which additionally serves to conserve space as well as facilitate ease of extracting data.

Although limited embodiments of this invention have been described, it should be obvious that numerous modifications would be possible by one skilled in the art without departing from the spirit of the invention, the scope of which is limited only by the following appended claims.

What is claimed is:

1. A shelf structure for supporting tape reels thereon, including the combination of:

a tray portion, said tray portion including (1) a relatively flat bottom wall, (2) a pair of spaced side walls extending perpendicularly of said bottom wall, (3) front and rear lips integral with said bottom wall and (4) means adjacent said front and rear lips for forming a plurality of side-by-side runways within said tray;

tray support means comprising a pair of side arms movably linked to said tray's respective side walls; and means for varying the angle formed by the intersection of (1) the plane formed by said tray's bottom wall with (2) said side arms; said angle varying means including movably alignable, fastener receiving, apertured portions toward the front and rear of each of said pairs of side walls and side arms, with at least one of said pairs having a plurality of such fastener receiving apertured portions, whereby said side arms may be affixed to said tray's side walls in a plurality of positions, and thus varying said angle.

2. The shelf structure of claim 1 wherein said side arms are provided with means for affixing said shelf structure to vertical post members.

3. The shelf structure of claim 2 and including post members having means for receiving said affixing means.

References Cited

UNITED STATES PATENTS

| | | | |
|---|---|---|---|
| 2,622,541 | 12/1952 | Smart | 211—148 X |
| 2,915,193 | 12/1959 | Bromberg | 211—184 X |
| 3,115,254 | 12/1963 | Dowdall | 108—108 X |
| 3,130,693 | 4/1964 | Shell | 211—148 X |
| 3,185,307 | 5/1965 | Higgins | 211—184 X |

FOREIGN PATENTS

| | | |
|---|---|---|
| 964,868 | 7/1964 | Great Britain. |
| 89,117 | 2/1957 | Norway. |

CHANCELLOR E. HARRIS, Primary Examiner

U.S. Cl. X.R.

211—148, 184